United States Patent [19]
Owen

[11] Patent Number: 5,948,241
[45] Date of Patent: Sep. 7, 1999

[54] ORIFICE PLATE FEED NOZZLE AND ATOMIZATION PROCESS

[76] Inventor: Hartley Owen, 24171 Kinnaird Pt Dr., Worton, Md. 21678

[21] Appl. No.: 08/906,556

[22] Filed: Aug. 5, 1997

[51] Int. Cl.⁶ ............................. C10G 11/00; B05B 7/00
[52] U.S. Cl. .................... 208/113; 208/153; 208/157; 239/432
[58] Field of Search .................. 208/113, 153, 208/157; 422/140; 239/432

[56] References Cited

U.S. PATENT DOCUMENTS

| | | | |
|---|---|---|---|
| 3,829,013 | 8/1974 | Ratnik | 239/14 |
| 4,784,328 | 11/1988 | Skraba | 239/432 |
| 4,793,554 | 12/1988 | Kraus et al. | 239/2.2 |
| 4,861,459 | 8/1989 | Cetinkaya | 208/157 |
| 4,875,996 | 10/1989 | Hsieh et al. | 208/157 |
| 5,017,343 | 5/1991 | Cetinkaya | 422/140 |
| 5,061,457 | 10/1991 | Hsieh et al. | 422/140 |
| 5,289,976 | 3/1994 | Dou et al. | 239/431 |
| 5,306,418 | 4/1994 | Dou et al. | 208/157 |
| 5,673,859 | 10/1997 | Haruch | 239/568 |
| 5,692,682 | 12/1997 | Soule et al. | 239/403 |

*Primary Examiner*—Walter D. Griffin
*Attorney, Agent, or Firm*—Laurence P. Hobbes

[57] ABSTRACT

A nozzle, and hydrocarbon conversion process using the nozzle for atomizing heavy feed to conversion zone, are disclosed. A liquid feed stream is atomized by radial out-to-in impingement of atomizing vapor, discharged onto an imperforate central region of a perforated plate in one end of a nozzle barrel, then sprayed through an outlet in the other end of the nozzle barrel. Preferably two perforate plates are used, a first at one end of the nozzle barrel and a second between the first plate and the outlet, which is preferably an elliptical orifice.

4 Claims, 2 Drawing Sheets

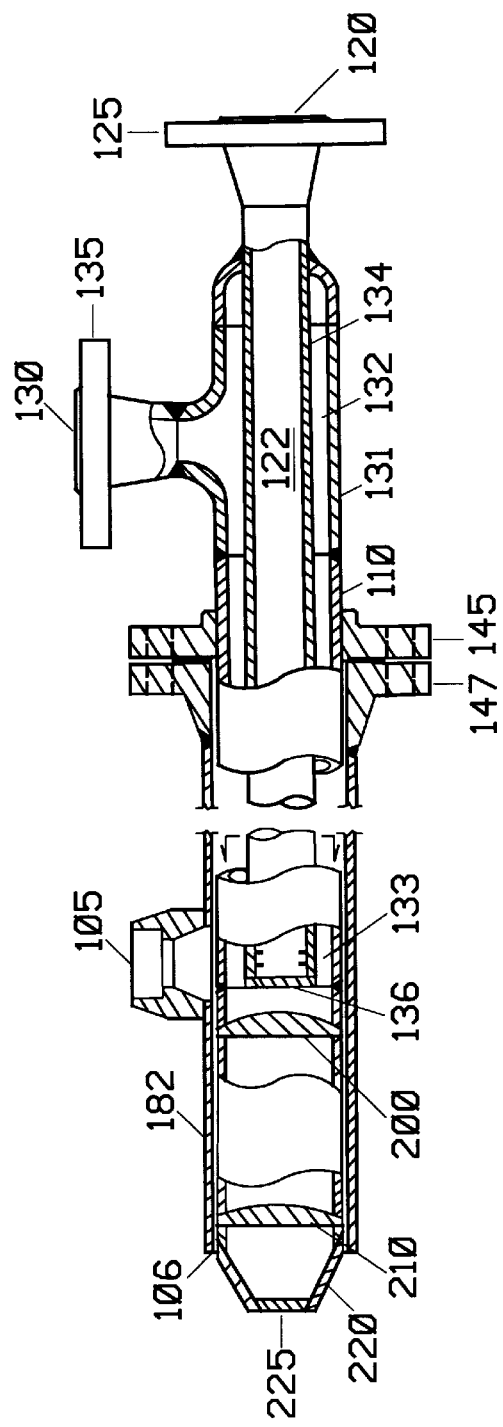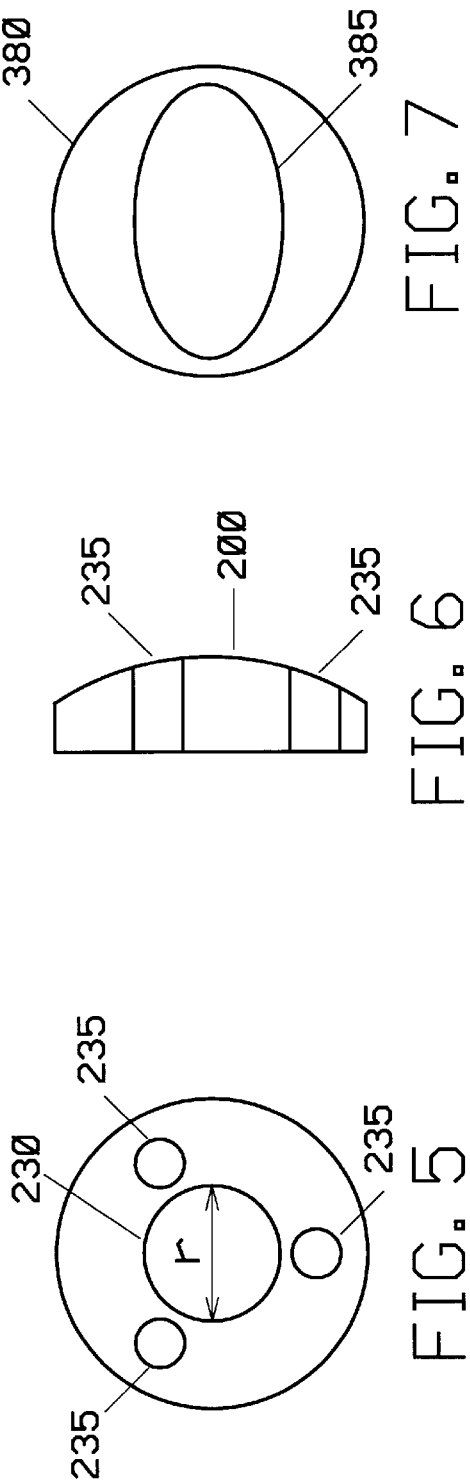

ORIFICE PLATE FEED NOZZLE AND ATOMIZATION PROCESS

BACKGROUND OF THE INVENTION

1. Field of The Invention

The invention relates to a feed nozzle and process for atomizing liquid feed to a refinery process such as a catalytic cracking reactor.

2. Description of Related Art

Refiners have long known that feed atomization is a problem. Although the problem is generic to any process where a liquid must be injected into a vapor phase, several specific problems merit special attention.

As an example, in FCC units the problem is contacting tons per hour of hot regenerated cracking catalyst with large volumes of heavy oil feed. Atomization of the heavy liquid feed into small droplets is needed to ensure complete vaporization of the feed in the base of the riser reactor. Solving this problem has become more difficult with the use of heavier feeds in FCC units. Many FCC's now process liquid feeds with 5–20 wt % resid or non-distillable material. These materials are almost impossible to vaporize in fractionators, so vaporizing them in less than a second or so in an FCC riser reactor is a formidable task.

Liquid feed atomization can also be a problem when adding a heavy liquid to a fractionating column, a hydroprocessing reactor and the like. Because the FCC process is used in most refineries, and the problem of feed atomization is especially acute in such units, the following discussion centers on FCC. It should be understood however, that the problem goes well beyond FCC, and the nozzle which I have developed is useful in many processes besides FCC.

Feed nozzles which were satisfactory for adding a readily vaporizable feed, such as a gas oil, are no longer adequate for heavier feeds. The problems are twofold: the heavier feeds are harder to vaporize because of their high boiling points, and the heavy feeds are harder to atomize because of their high viscosity even at the high temperatures existing in FCC riser reactors.

Efforts of refiners to cope with heavier feeds, or improve the vaporization of lighter ones, will be briefly reviewed.

Some of the efforts at improving regenerated catalyst/feed contacting were on the catalyst side, i.e., the use of lift gas to smoothly lift catalyst up into the riser. Other approaches assumed that catalyst distribution will be poor and forced oil distribution (via multiple nozzles) to be equally poor.

Increased steam addition is common practice for dealing with heavier feeds. Increased atomization steam usually leads to increased pressure drop across the existing feed nozzles, and increased sour water production. Although some improvement in feed dispersion is usually achieved, the problems of increased sour water production, and limits on pressure at which feed can be delivered to the nozzle inlets, limit the improvement from merely increasing steam rate.

Some nozzle designs were developed which required high oil pressure drops across the nozzle for effective operation. Many can only supply the oil feed at relatively low pressure. Major capital expenses would be required for these refiners to use such nozzles. Using a high pressure liquid feed also consumes a considerable amount of energy.

An overview of developments in nozzles is presented in Fluid Catalytic Cracking Report: 50 Years of Catalytic Cracking; A. A. Avidan et al, Oil & Gas Journal, Jan. 8, 1990, at page 50. I am a co-author of this report. As stated there, open pipe or slotted, impact, spiral and critical venturi nozzles have all been used.

The open pipe or slotted nozzle gives coarse irregular droplets. It is not well suited for injecting heavy feeds into an FCC riser reactor, but many refiners still use such nozzles.

Critical venturi nozzles, where an oil and steam mixture pass through a venturi section into a larger, intermediate chamber and discharged through a restricted nozzle, can achieve very small droplet sizes. Such nozzles require high liquid pressure drops and develop a narrow spray pattern with a high velocity which can cause mischief in the process unit into which a liquid is injected. Such nozzles are better suited to making snow than injecting heavy viscous oils into refinery units.

A hybrid approach, use of high velocity steam (1000 to 1800 ft/sec) to atomize a low velocity oil stream (20 to 50 ft/sec) was taught in U.S. Pat. No. 3,654,140, which is incorporated by reference. The high velocity steam imparts energy to the low velocity liquid. FIG. 2 of '140 shows oil discharged as a cone of liquid which is broken into droplets by a high velocity steam stream enveloping the cone. The design was an improvement over the nozzle in U.S. Pat. No. 3,152,065, where liquid passed through an annular region about a central steam pipe to contact an expanding steam stream upstream of a restricted opening. Imparting a centrifugal component to the liquid stream probably threw the liquid to the sides of the nozzle, and may have impaired atomization. The liquid went out as a cone and was not impinged by the high velocity steam stream in the central region of the nozzle.

Although there are myriad nozzle designs, many of which are unique and hard to classify, they can be more or less arbitrarily classified as relying on one or more of the following mechanisms for drop formation.

Restriction/Expansion is the most widely used form of FCC feed nozzle. A mixture of 1–5 wt % atomizing steam and the heavy, preheated feed, pass through a slot or circular orifice to form a spray.

Mixing/Expansion involves use of swirl vanes followed by an orifice.

Shearing atomizes liquid by peeling off a thin sheet of the nozzle feed stream which spontaneously breaks up into small droplets. Spiral FCC feed nozzles are examples.

Gas jet nozzles pass an atomizing gas stream through multiple orifices to strike a liquid stream. The Lechler nozzle is a good example of this type of nozzle.

Impingement nozzles atomize by the high velocity impact of a liquid on a solid surface. The Snowjet nozzle is of this type.

Although it might seem possible to simply stack different types of nozzles in series to improve atomization in practice it does not work. The additional stages may or may not improve atomization, but will always increase pressure drop and this alone will usually prevent simple stacking of these unit operations. Many attempts to improve nozzle performance, as by stacking atomizing devices, degrade performance.

In refinery process units the nozzles must be robust and reliable, as run lengths of one or two years or more are common. FCC units have additional constraints. The hydrocarbon feeds are supplied at a certain pressure, usually around 50–200 psig. Because of the large size of these streams, and the cost of energy needed to pump the feed to higher pressures, and site constraints which frequently prevent easy addition of high pressure pumps, it is important to have a nozzle which will work well with low oil pressures.

Medium or high pressure steam is usually readily available, and is a preferred atomization medium, but refiners usually want to minimize its use. Medium or high pressure steam is a valuable commodity in a refinery, and its use fills much of the FCC riser and downstream processing equipment with an inert material. Refiners are also reluctant to use too much steam, or to have too high an exit velocity from the nozzle, because of catalyst attrition, and riser erosion concerns.

An additional constraint for FCC units is that the material exiting the nozzle should contact as much of the catalyst flowing by the nozzle as possible, without carrying through the catalyst to a side portion of the riser.

It is also beneficial if the nozzles used, whether vertical or side mounted, are relatively small, so that flow of hot catalyst up the riser is not disrupted.

It is also important to have a nozzle which is inexpensive to build so that it can be built from readily available materials such as commercially available pipe and tubing. Such nozzles can also be readily serviced. In contrast, nozzles which require a critical venturi section are more difficult to fabricate, just as venturi meters cost more than orifice flow meters. A concern with precisely machined sections is that after several years of harsh service the precisely machined surfaces may erode.

The nozzle in U.S. Pat. No. 5,289,976 and 5,306,418 represents the "state of the art" in heavy liquid feed nozzles, and represents a significant improvement over the nozzles currently in use. This nozzle had several sections in series:

a radial out-to-in initial atomization section, an impingement plug, an annular expansion region, and a nozzle outlet.

This nozzle was very effective, based on the reported tests on atomizing water. I wanted to develop a nozzle which would be simpler and easier to fabricate and which would provide an acceptable alternative to this design. Based on my experiments with vaporizing water/air mixtures, I was able to develop a nozzle which is somewhat simpler and works better.

In my design I retain an initial atomization section, a feature used in many nozzle designs but eliminate the impingement plug and the annular expansion region. One or more internal plates with a few holes drilled in each plate provided excellent atomization. These could be termed a type of off-center orifice plates with multiple holes, which are utterly unlike orifice plates used to measure flows. These plates are easy to fabricate, readily replaced, and provide excellent atomization. They provided the key to a simpler, shorter, and more effective nozzle.

BRIEF SUMMARY OF THE INVENTION

Accordingly, the present invention provides an atomizing nozzle comprising an initial atomizer having a generally cylindrical inner surface having an axis, a diameter and a cross sectional area, a first end, a second end, a borehole extending from the first end to the second end, a liquid feed inlet connective with the first end, a plurality of radially distributed atomizing gas inlets through said cylinder; at least one impingement perforate plate atomizer having an imperforate central portion aligned with the axis of said initial atomizer and at least two symmetrically disposed perforations distributed on said plate about said imperforate central portion; a nozzle barrel having an axis and axially aligned with said initial atomizer, a diameter at least twice as large as the diameter of said initial atomizer, a first end connective with said plate atomizer and a second end connective with a nozzle outlet.

In another embodiment, the present invention provides a fluidized catalytic cracking process wherein a heavy feed is catalytically cracked in a riser cracking reactor means to produce cracked products and spent catalyst, spent catalyst is stripped in a stripping means and regenerated in a catalyst regeneration means to produce hot regenerated catalyst which is recycled to said riser reactor, characterized by use of at least one multi-stage atomizing feed nozzle to inject feed in a base portion of said riser reactor, said nozzle comprising an initial atomization section wherein atomizing gas is charged, in radial out-to-in flow, into a flowing stream containing liquid hydrocarbon, to partially atomize said liquid feed stream and produce a partially atomized jet having a diameter and cross sectional area and having a less atomized core region and a more atomized peripheral region; an impingement perforate plate contiguous with and downstream of said initial atomization section, said plate having an imperforate central portion receiving said partially atomized jet and producing a well atomized mixture by the action of impingement of said partially atomized jet against said imperforate central portion, and a plurality of perforations symmetrically distributed about said imperforate central portion distributing said well atomized mixture into a contiguous, downstream nozzle barrel; said nozzle barrel having a nozzle outlet having a cross sectional area smaller than the cross sectional area of said nozzle barrel at an end of said nozzle barrel.

In another embodiment, the present invention provides a hydrocarbon conversion process for converting a normally liquid hydrocarbon stream having an average boiling point by contact with a fluidizable solid at hydrocarbon conversion conditions including a temperature sufficiently high to vaporize a majority by weight of said liquid hydrocarbons to produce a converted product having a lower average boiling point characterized by adding said normally liquid hydrocarbon feed to said process using the above nozzle to produce a converted hydrocarbon having a lower average boiling point as a product of the process.

Other embodiments relate to use of my nozzle to add liquids to distillation columns and other refinery processes.

BRIEF DESCRIPTION OF THE DRAWINGS

FIG. 4 (invention) shows one embodiment of my nozzle, with an initial atomizing section, multiple orifice plate impingement section and nozzle outlet.

FIG. 5 (invention) is a detailed view of a preferred orifice plate impinger.

FIG. 6 (invention) shows a cross sectional view of the orifice plate impinger.

FIG. 7 (invention) shows a cross sectional view of a preferred orifice outlet.

DESCRIPTION OF THE PREFERRED EMBODIMENTS

Prior Art FCC Feed Nozzles—FIGS. 1–3

Figures 1, 2, 3:
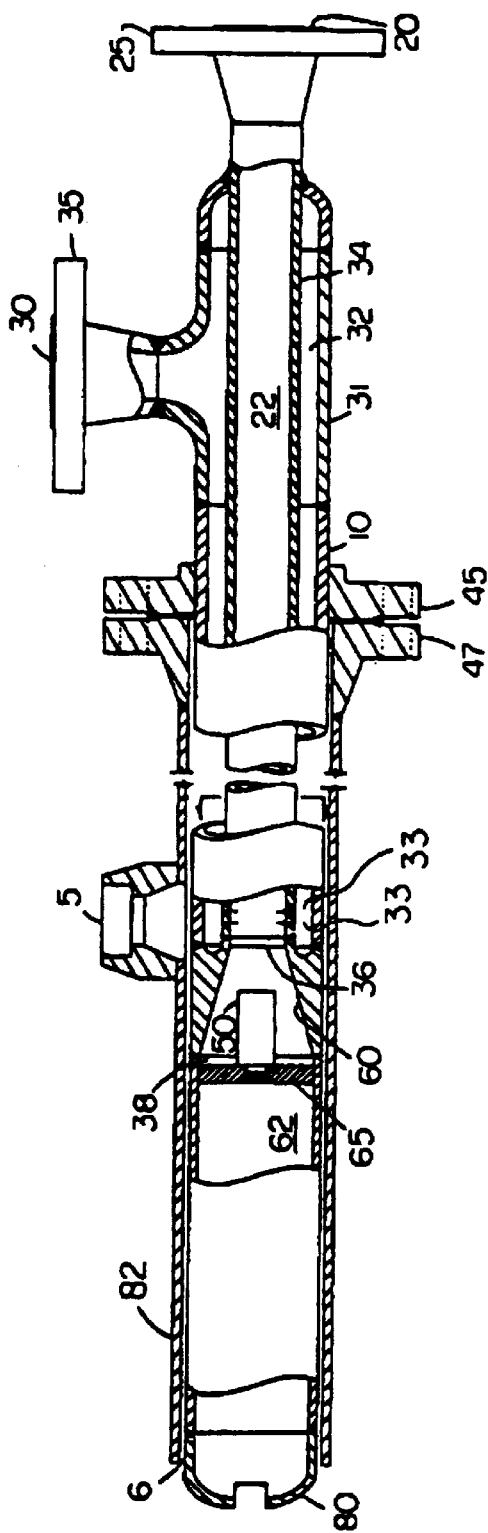
FIG. 1 and FIG. 2 (prior art) show different views of a 180° degree slotted cap nozzle outlet.
FIGS. 3 (prior art) shows the nozzle of U.S. Pat. No. 5,306,418, with an initial atomizing section, low pressure drop plug and baffle (which also serves as an expansion section) and nozzle outlet.

Many older FCC units use feed nozzles of a length of pipe with nozzle outlets shown in FIGS. 1 and 2. The end of the nozzle 80', with notch or slot 85', sprays liquid feed into FCC risers. The feed upstream of the nozzle is an atomized mixture of steam, or other atomizing fluid, and liquid hydrocarbon feed, usually with a minor amount of vaporized hydrocarbon feed. The slot orifice 85' is usually a cut out or ground out portion of the end cap 80'. Typically the slot orifice has 180° opening, and has a width or open portion equivalent to 15–50% of the diameter of the pipe or end cap 80' containing the slot orifice.

In these orifice nozzles, or those shown in the Oil and Gas Journal report, oil and steam are injected into a pipe, the end of which terminates in a reduced diameter orifice. The nozzle atomizes or disperses the oil by imparting a high velocity to the oil and atomizing steam. Poor results are obtained, especially with heavy, difficult to vaporize feeds. These nozzles were satisfactory when processing readily distillable feeds, such as gas oils, but their deficiencies become more evident with feeds containing more than about 5 wt % non-distillable material. The problem is that much of the liquid feed is poorly atomized. The large liquid droplets can take a long time to vaporize, or may not vaporize at all and form coke. In some units the feed is not vaporized until after the catalyst is significantly deactivated.

The FIG. 3 nozzle (prior art—U.S. Pat. No. 5,306,418) used several stages to atomize droplets of heavy oil, an initial atomization section, an impingement and expansion section and an orifice tip. The patent's teaching is abstracted below.

Initial Atomization

Heavy liquid feed is charged via inlet 20 to atomizing chamber 22 of nozzle 10. Flange assembly 45 mates with flange 47 and nozzle shield 82 which extends into the FCC riser reactor. Oil is atomized as it flows through chamber 22 by the transverse injection of steam. Steam is admitted via inlet 30. Flanges 35 and 25 around inlets 20 and 30, permit field connection of steam and oil lines. Steam enters into annular space 32 between walls 34 of atomization chamber 22 and walls 31 of nozzle 10 and passes through holes 33 drilled at right angles through pipe 34.

The oil is atomized significantly passing from inlet 20 to outlet 36 of the initial atomization zone. Liquid flows axially and gas flows radially out to in.

Impingement/Expansion

The two phase mixture from outlet 36 discharges onto plug 50, which preferably has a cross sectional area no greater than that of the atomizing chamber 22. Plug 50 is in an expansion region which permits expansion of atomized oil and steam. The use of a truncated, inverted cone section 60 having an ID close to that of the ID of the outlet of region 22 in pipe 34, and an angle of 5 to 30° from centerline, most preferably 15°, minimizes pressure losses due to expansion. Preferably the minimum open area of the pipe around the plug is at least 130% or more of the cross sectional area of pipe 34. Preferably the end of the plug is cut at a slight angle, from 2 or 3° to 15 or 20°, and ideally around 10°. This shallow angle allows for a strong impact of liquid and atomizing fluid against the plug and good atomization, while simultaneously channelling flow evenly around the plug into a downstream expansion section.

The expansion section has an outlet diameter roughly equal to that of the bore of the pipe leading to the nozzle outlet and preferably terminates with a baffle section 65. Preferably the baffle is roughly in the form of a cross or "X", defining four pie shaped openings through which atomized feed passes. The function of the baffle is distribute droplets across the cross-section of the nozzle barrel, and provides enough metal or other material to support impingement plug 50. The patentees taught that a solid plate with 4 holes drilled in it will behave hydraulically much like the "X" baffle. The baffle should have sufficient open area so that there will be only a modest pressure drop across it. An open area of at least 25% of the cross sectional area of the outlet of the expansion section was taught as sufficient.

Orifice Tip

The patent taught it beneficial to use an orifice outlet, with the cross sectional area of the orifice significantly less than the cross sectional area of the snout or barrel just upstream of the orifice. A 3.8:1 ratio was said to give good results. The orifice may have additional atomizing means within or just downstream of the orifice tip, such as a spiral nozzle, but these generally will not be needed, and will increase the pressure drop, complexity, and failure rate unduly.

The patent taught that a wedge or blocks could be added upstream of, within, or downstream of the orifice. They might increase atomization efficiency but usually not enough to justify the increased pressure drop. Swirl vanes degraded performance. The patent taught it preferred to operate with an orifice outlet consisting essentially of an orifice.

Nozzle of The Invention

While some parts of my nozzle may be identical to some parts of the nozzle disclosed in U.S. Pat. No. 5,306,418 (and parts of other prior art nozzles) there are significant differences. An overview of the nozzle follows, which leads into a review of FIGS. 4–6 and is then followed by a more detailed review of each section.

In somewhat oversimplified terms, my nozzle involves an initial atomization section and at least one, and preferably two or more, impingement orifice plates in a barrel leading to a nozzle outlet.

FIG. 4 (invention) shows one embodiment of my nozzle, with an initial atomizing section, a multiple orifice plate impingement section and a nozzle outlet.

Heavy liquid feed is charged via inlet 120 to atomizing chamber 122 of nozzle 110. Flange assembly 145 mates with flange 147 and nozzle shield 182 which extends into the FCC riser reactor. Oil is atomized as it flows through chamber 122 by the transverse injection of steam. Steam is admitted via inlet 130. Flanges 135 and 125 around inlets 120 and 130, permit field connection of steam and oil lines. Steam enters into annular space 132 between walls 134 of atomization chamber 122 and walls 131 of nozzle 110 and passes through holes 133 drilled at right angles through pipe 134.

The oil is atomized significantly passing from inlet 120 to outlet 136 of the initial atomization zone. Liquid flows axially and gas flows radially out to in, and a resulting two phase mixture is axially discharged via outlet 136 onto an imperforate central region 235 of impingement plate 200. A jet or stream of liquid hits the central region and is further atomized as it bounces off and around, to flow through it. The atomized mixture then flows through a second impingement orifice plate 210 where further atomization occurs. A well atomized mixture is discharged via conical section 220 terminating in outlet 225.

As is customary in FCC and many refinery processes, purge steam may be added via means 105 to pass around the nozzle and exit via annular opening 106. This is conventional.

FIG. 5 shows another view of plate 210. Three multiple orifices 235 are symmetrically disposed about the imperforate central region 230, shown as a circle with radius "r".

FIG. 6 is a cutaway view of plate 200, showing the plate is fairly thick and how some of the holes 235 appear. In the embodiment shown, both plates 200 and 210 are identical.

FIG. 7 shows a view of a preferred orifice outlet 380, with an elliptical slot 385 rather than a rectangular slot. Phrased another way, the prior art slot shown in FIG. 2 will give a fairly sharp fan shaped spray. I want a less well defined fan shape, one with considerable fattening of the fan shape near the axis of the nozzle and some narrowing of the fan shape near the barrel, or outer diameter, of the nozzle.

Initial Atomization Section

This part of the nozzle starts the atomization process and creates conditions which allow the downstream portions of the nozzle to function well. The essential elements are moderate mixing of liquid and vapor, with a significant amount of kinetic energy. This stage could use 50 year old nozzle technology, even just a mixture of liquid and vapor flowing through a pipe.

Preferably, the initial atomization section combines axial liquid flow with radial vapor flow. Fortunately, the art has developed several excellent approaches to achieve this end, such as the Lechler Supersonic nozzle and the first section of the nozzle U.S. Pat. No. 5,306,418.

Lechler Supersonic—This nozzle has a converging section, with 16 air jets, emerging from 3/16" orifices situated along four circumferential rows, which impinge perpendicularly into a cylindrical core of water. The nozzle then has a diverging section. This nozzle produces good atomization around the outer edge of the spray, but very large droplets persisted in the center. The nozzle has a gradually converging section toward the nozzle outlet. Such nozzles are commercially available.

The approach in U.S. Pat. No. 5,306,418 was to simply use a length of straight pipe, with atomizing vapor added via two rings of holes. The air holes were sized to utilize fully the pressure drops available on the gas side. Because of its simplicity, and because it works, I prefer to use the approach described in '418 for the initial atomization section.

Impingement Orifice Plate

The impingement orifice plate or plates serves several functions. The initial atomization section discharges onto a solid or imperforate portion of the impingement orifice plate. The imperforate portion of the orifice plate serves as something for the poorly atomized V/L mixture discharged from the first section to hit against.

The use of impingement to improve atomization of a V/L mixture is not new, such a mechanism is used in the Snowjet nozzle, the U.S. Pat. No. 5,306,418 nozzle, and others. What is new is use of a single plate to perform the function of an impingement element and flow distributor.

My impingement plate, like impingement surfaces used in the prior art, may beneficially have a cut or ground surface, so that it resembles a mushroom. The poorly atomized stream hits the top of the mushroom. Flow is deflected around to the holes or slots drilled or punched through the mushroom. The central imperforate portion may be almost flat, or conical, but preferably has a mushroom shape with an angle in the central, imperforate section —measured at the outer limits of the stream discharged onto the central section, of 5 to 30°, preferably 20° maximum.

The cross sectional area of the imperforate area of the mushroom plate preferably is at least as large as the open area of the feed pipe.

While I prefer to use simple holes drilled lengthwise through the mushroom cap, or impingement plate, it is possible to use other geometries, though not necessarily with equivalent results. Thus slots, triangles, or even four large pie-shaped orifices (as was used in the U.S. Pat. No. 5,306,418 nozzle) may be used.

The function of the orifice openings, or slots, etc., is to distribute the well atomized, post-impingement mixture into the nozzle barrel for further mixing, either by random action in the nozzle barrel, or preferably by passing through at least one more orifice impingement plate.

When two or more orifice impingement plates are used, preferably the plates are rotated so that the holes are out of register. When two or more plates are used, the plates may be identical, although preferably rotated so that fluid discharged from one orifice hole will hit a solid portion of a downstream impingement plate rather than a hole in the downstream plate.

The spacing between orifice plates will usually be at least four inches, and will typically be between 4" and 6".

Preferably the discharge end of the initial atomization section is fairly close to the imperforate region of the impingement plate, and typically will be about 4"–6". Expressed in terms of a diameter "d" of the initial atomization section, the distance from the discharge end of the initial atomization section to the central imperforate region is no more than 1 d.

Orifice Outlet

Any of the conventional orifice outlets known in the art can be used (such as those shown in the Oil & Gas Journal Article previously discussed). If desired, the slotted cap outlet such as that shown in FIG. 3 and 4 of U.S. Pat. No. 5,306,418 may be used, but is not preferred. A circular orifice can be used for vertically mounted nozzles, while modified slots developing a relatively wide fan shaped spray can be used for nozzles mounted circumferentially around the perimeter of an FCC riser. A preferred slot, which is elliptical rather than rectangular, is shown in FIG. 7. In my tests a rectangular slot orifice outlet tended to at least sporadically slug, while the elliptical outlet was much better in this regard.

I prefer to use the simple conical outlet shown in FIG. 5. I do not like abrupt changes in nozzle geometry at this point, and it is my belief that a conventional round orifice prevents stagnant regions where large droplets can collect to eventually be discharged. I did not check for this quantitatively, but base my beliefs on observations of large droplets coming out when I used a more conventional slot orifice.

The orifice outlet preferably has a diameter roughly equal to ½ of the diameter of the nozzle barrel containing the impingement orifice plate(s).

In the preferred nozzle configuration, all parts function in a complementary fashion. The initial atomizing section does a good job of atomizing most of the liquid feed. The impingement perforate plate atomizes the modest amount of larger droplets remaining in the central regions of the atomizing section, while the orifice or other openings in the impingement perforate plate distribute the atomized mixture into the nozzle barrel. Preferably two perforate plate sections are used.

Additional mixing occurs as the well atomized mixture passes through the perforations in the plates, and again when the mixture passes through the nozzle outlet.

Experiments

In tests with air water mixtures, simulating steam and oil, respectively, I observed that my nozzle was as good or better than any other tested with up to 5 wt % air.

Anticipated Use of Invention

The nozzle should be widely applicable in refinery and petrochemical processes, and not subject to plugging. The only fine holes in the preferred design admit high pressure steam to the initial atomizing section. The portions of the nozzle wet by hydrocarbon oil (or other liquid feed) are relatively open, i.e., the large holes drilled in the orifice impingement plate.

As applied to hydrotreaters, the use of such a nozzle will significantly improve catalyst use and minimize channelling of feed through the fixed bed of hydrotreating catalyst.

As applied to hydrocrackers, the use of my nozzle will greatly improve the efficiency and the safety of the process, by preventing liquid maldistribution, which can lead to localized areas of high temperature which tend to travel through the hydrocracking bed and get worse. The nozzle can be used for adding liquid feed, and/or liquid quench to hydrocrackers.

The nozzle of the present invention may also be used to add any essentially solids free vapor/liquid phase to any refinery unit operation. The efficiency of packed towers will be greatly improved if the feed is added via an orifice tip nozzle with swirl vanes. In such an application the vapor present in the two phase feed will usually be sufficient to disperse the liquid over the packed column.

The nozzle will be especially useful for adding heavy liquid feeds to fluidized bed refinery processes such as the fluidized catalytic cracking process and to fluid bed demetallation processes involving contact of heavy oil or tar sands with a relatively inert solid or coke, e.g., fluid bed cokers and the like.

Based on limited experimental tests, I believe my nozzle to be as good as or better than any known nozzle for the purposes of atomizing heavy oils as they are injected into refinery process units. I am not sure why my nozzle seems to work better than the design reported in the 5,306,418 nozzle, which is an excellent nozzle. It may be that the patentees, in '418, in pursuit of a low pressure drop expansion section, did not see the additional atomization that can occur in forcing a well atomized stream through several orifice openings. The superior performance of my nozzle may also be due to multiple impingement zones.

Looking only at that portion of the nozzle, comparing my orifice openings to the lower pressure drop annular opening of '418, I would think my design would have a much higher pressure drop. Undoubtedly my orifice openings will have a higher pressure drop, and consume more energy, than the somewhat venturi shape of '418.

I believe, but can not prove, that the increased energy consumption associated with passing through my orifices, at least performs useful work in further atomizing the flowing stream. Most important, as recognized by those skilled in the refinery and the nozzle arts, it is the overall performance of the device that counts, rather than the performance of any individual section.

My device combines an initial atomization section with a fairly high pressure drop impingement/orifice opening which all work together to provide outstanding atomization. As an additional benefit, the device is simple to construct and should be able to tolerate years of service without undue degradation in performance. If the nozzle requires service, it can be easily worked on in the field. The high wear part of the device is the impingement plate which can be replaced as needed. When two impingement plates are used, it will be possible to use duplicate plates and simply rotate the two plates if performance degrades due to wear on the impingement portion of the plate. In most instances most of the wear will occur where the stream discharged from the initial atomizer strikes the central region of the plate with much less wear on the holes. The eroded first or primary plate can serve very well if swapped with the secondary plate, which means that the device can carry its own spare parts.

Depending on local conditions, and on the amount of sands/solids/sediment present in the heavy oil or other feed liquid, it may be beneficial to hard face the surface of portions of the nozzle expected to suffer erosion during use. This might be just the primary impingement plate or could involve the entire nozzle.

The design is surprisingly compact, a benefit of using relatively short orifice openings as opposed to longer venturi shaped openings.

I claim:

1. A fluidized catalytic cracking process wherein a heavy feed is catalytically cracked in a riser cracking reactor means to produce cracked products and spent catalyst, spent catalyst is stripped in a stripping means and regenerated in a catalyst regeneration means to produce hot regenerated catalyst which is recycled to said riser reactor, characterized by use of at least one multi-stage atomizing feed nozzle to inject feed in a base portion of said riser reactor, said nozzle comprising:

an initial atomization section wherein atomizing gas is charged, in radial out-to-in flow, into a flowing stream containing liquid hydrocarbon, to partially atomize said liquid feed stream and produce a partially atomized jet having a diameter and cross sectional area and having a less atomized core region and a more atomized peripheral region;

an impingement perforate plate contiguous with and downstream of said initial atomization section, said plate having:

an imperforate central portion receiving said partially atomized jet and producing a well atomized mixture by the action of impingement of said partially atomized jet against said imperforate central portion, and a plurality of perforations symmetrically distributed about said imperforate central portion distributing said well atomized mixture into a contiguous, downstream nozzle barrel;

said nozzle barrel having a nozzle outlet having a cross sectional area smaller than the cross sectional area of said nozzle barrel at an end of said nozzle barrel.

2. The process of claim 1 wherein said initial atomization section comprises a length of feed pipe having an upstream end connective with a source of liquid feed, a downstream end with an unobstructed or open outlet and plurality of atomizing gas injection holes drilled through said feed pipe and radially distributed about said pipe and within one feed pipe diameter of said outlet, and an atomizing gas distribution section having an inlet for atomizing gas and an outlet encompassing said plurality of atomizing gas injection holes.

3. The process of claim 1 wherein said impingement plate has a central portion with an imperforate portion having a cross-sectional area larger than a cross sectional area of said initial atomization section measured at the outlet thereof.

4. A hydrocarbon conversion process for converting a normally liquid hydrocarbon stream having an average boiling point by contact with a fluidizable solid at hydrocarbon conversion conditions including a temperature sufficiently high to vaporize a majority by weight of said liquid hydrocarbons to produce a converted product having a lower average boiling point characterized by adding said normally liquid hydrocarbon feed to said process using a nozzle comprising:

an initial atomizer having a generally cylindrical inner surface having an axis, a diameter and a cross sectional area, a first end, a second end, a borehole extending from the first end to the second end, a liquid feed inlet connective with the first end, a plurality of radially distributed atomizing gas inlets through said cylinder;

at least one impingement perforate plate atomizer having an imperforate central portion aligned with the axis of said initial atomizer and at least two symmetrically disposed perforations distributed on said plate about said imperforate central portion; and a nozzle barrel having an axis and axially aligned with said initial atomizer, a diameter at least twice as large as the diameter of said initial atomizer, a first end connective with said plate atomizer and second end connective with a nozzle outlet, to produce a converted hydrocarbon having a lower average boiling point as a product of the process.

\* \* \* \* \*